United States Patent [19]

Blümel et al.

[11] 4,357,439

[45] Nov. 2, 1982

[54] SHELF-STABLE ETHYLENE-α-OLEFIN (DIENE) ELASTOMER POWDERS COMPRISING A RELEASE AGENT AND A PROCESS FOR THE PRODUCTION THEREOF

[75] Inventors: Harald Blümel; Horst G. Haag, both of Marl, Fed. Rep. of Germany

[73] Assignee: Chemische Werke Hüls Aktiengesellschaft, Marl, Fed. Rep. of Germany

[21] Appl. No.: 295,045

[22] Filed: Aug. 21, 1981

[30] Foreign Application Priority Data

Aug. 21, 1980 [DE] Fed. Rep. of Germany ....... 3031487
Aug. 21, 1980 [DE] Fed. Rep. of Germany ....... 3031508
Aug. 21, 1980 [DE] Fed. Rep. of Germany ....... 3031556

[51] Int. Cl.$^3$ ............................................ C08L 23/16
[52] U.S. Cl. .................... 524/493; 428/407; 524/496; 525/232; 525/235; 525/239; 525/240
[58] Field of Search .................. 525/1, 232, 235, 239, 525/240; 428/404, 407; 260/42.46, 42.47

[56] References Cited

U.S. PATENT DOCUMENTS

| | | | |
|---|---|---|---|
| 3,361,850 | 1/1968 | Young | 525/232 |
| 3,436,243 | 4/1969 | Kruger | 428/407 |
| 3,452,120 | 6/1969 | Arnold | 525/227 |
| 4,263,200 | 4/1981 | Busch et al. | 525/239 |
| 4,269,740 | 5/1981 | Woods et al. | 525/239 |

FOREIGN PATENT DOCUMENTS 56-21841  2/1981  Japan ................................ 428/407

Primary Examiner—Lewis T. Jacobs

Attorney, Agent, or Firm—Millen & White

[57] ABSTRACT

A process for producing a shelf-stable ethylene-α-olefin (diene) elastomer powder which comprises a release agent, comprising grinding crumbs or preliminarily comminuted particles of an ethylene-α-olefin (diene) elastomer having a green strength of 5–20 MPa and a Mooney viscosity ML (1+4) 100° C. of 50–150, and, prior to, during or after the grinding step, adding 0.5–10 parts by weight per 100 parts by weight of the ethylene-α-olefin (diene) elastomer, of a release agent which is (a) polyethylene of a density of 0.910–0.975 g/cm$^3$, a viscosity number of 50–330 cm$^3$/g and a melt index of 0.2–50 g/10 min, polypropylene of a density of 0.90–0.910 g/cm$^3$, a viscosity number of 100–1000 cm$^3$/g and a melt index of 0.1–50 g/10 min, polybutene-1 of a density of 0.910–0.975 g/cm$^3$, a viscosity number of 100–1000 cm$^3$/g and a melt index of 0.1–100 g/10 min, polyvinyl chloride of a viscosity number of 50–200, all having an average secondary particle size of 5–50 μm;

(b) a synthetic amorphous silicic acid (SiO$_2$) having an average primary particle size of 0.01–0.2 μm and an average secondary particle size of 5–35 μm; a naturally occurring silicic acid, at least 65% by weight of which has an average primary particle diameter of <5 μm and an average secondary particle size of 7–50 μm; or a silicic-acid-containing mineral having an average primary particle size of 0.5–2.5 μm and an average secondary particle size of 10–35 μm; or (c) a carbon black with an average primary particle size of <0.3 μm.

13 Claims, No Drawings

SHELF-STABLE ETHYLENE-α-OLEFIN (DIENE) ELASTOMER POWDERS COMPRISING A RELEASE AGENT AND A PROCESS FOR THE PRODUCTION THEREOF

BACKGROUND OF THE INVENTION

It is conventional to grind synthetic resins and elastomers into powders of varying degrees of fineness. The degree of comminution attainable depends on the type of grinding apparatus utilized, the grinding conditions, and certain properties of the polymers employed.

It is also known that elastomer powders produced by grinding have a tendency to recombine into more or less large, coherent clusters or lumps, especially under temperature conditions such as those which occur during transportation or storage, for example. This presents an obstacle to ensiling, to conducting the dry-powder mixing technique conventionally used with pulverulent synthetic resins and also to utilizing the advantageous processing called powder elastomer technology.

To prevent this undesired caking in the conventional grinding process, according to the disclosure of DOS [German Unexamined Laid-Open application] No. 2,648,301 [=U.S. Pat. No. 4,157,790], it is necessary to add powdering agents (fillers) to the granulated elastomer. These are added in such large amounts that the powdered, pulverulent elastomer no longer exhibits the properties of the unpowdered elastomer during further processing, especially its mechanical properties. For this reason, the aforementioned DOS No. 2,648,301 describes and claims a process for the production of elastomer powders low in filler content in accordance with the grinding method, making it possible to make do with a content of powdering agent of less than 7% by weight. The multistage process comprises first converting the elastomer by mechanical preliminary comminution into large-surface and pore-rich particles; introducing the total amount of powdering agent through nozzles into the pneumatically conveyed stream of elastomer particles, so that the powdering agent is almost entirely adsorbed by the elastomer particles and the left-over surrounding powdering agent is conveyed to the grinding step with an extensively uniform distribution between the powdered elastomer particles; executing the grinding of the elastomer particles at a low temperature so that flowing of the elastomer is prevented and the large-area and recess-endowed structure of the pulverulent elastomer particles created by the grinding step remains preserved; effecting an adsorbing of any still unbound or freshly fed powdering agent by the elastomer powder in a pneumatic conveying zone following the grinding process; and cooling the thus-obtained powdered elastomer powder to such an extent that no warm flow of the elastomer occurs.

The results and requirements of such prior art processes leave much to be desired.

SUMMARY OF THE INVENTION

Accordingly, it is an object of the present invention to provide a simple and economical process to produce shelf-stable ethylene-α-olefin (diene) elastomer powders by grinding of appropriate crumbs or preliminarily comminuted particles.

It is another object of this invention to provide such a process involving the addition of minimum amounts of a release agent.

Upon further study of the specification and appended claims, further objects and advantages of this invention will become apparent to those skilled in the art.

These objects have been attained by providing a process for the production of shelf-stable ethylene-α-olefin (diene) elastomer powders which contain a release agent comprising grinding elastomer crumbs or preliminarily comminuted elastomer particles and adding a release agent, wherein the ethylene-α-olefin (diene) elastomer has a green strength of 5–20 MPa and a Mooney viscosity ML (1+4) 100° C. of 50–150; 0.5–10 parts by weight, based on 100 parts by weight of the ethylene-α-olefin (diene) elastomer, of the release agent is added to the elastomer prior to, during or after the grinding process; and the release agent is (a) a solid polymer of the group polyethylene, polypropylene, polybutene-1, or polyvinyl chloride, with an average secondary particle size of 5–50 μm.

(b) a synthetically prepared, amorphous silicic acid ($SiO_2$) having an average primary particle size of 0.01–0.2 μm and an average secondary particle size of 5–35 μm; a naturally occurring silicic acid at least 65% by weight of which has an average primary particle diameter of <5 μm and an average secondary particle size of 7–50 μm; or a silicic-acid-containing mineral having an average primary particle size of 0.5–2.5 μm and an average secondary particle size of 10–35 μm; or (c) carbon black with an average primary particle size of <0.3 μm.

DETAILED DISCUSSION

Suitable ethylene-α-olefin (diene) elastomers for use in the process of this invention include, on the one hand, saturated ethylene-α-olefin elastomers (EPM), and, on the other hand, unsaturated ethylene-α-olefin-diene elastomers (EPDM). It is known that these materials can be prepared from ethylene, one or several α-olefins of 3–8 carbon atoms, primarily propylene and/or butene-1, and optionally one or several unconjugated dienes using so-called Ziegler-Natta catalysts which can additionally contain activators and modifiers, in a solution or dispersion, at temperatures of −30° to +100° C., for example according to the processes of DAS [German Published Application] No. 1,570,352 [=U.S. Pat. No. 3,629,212]; DAS 1,595,442 [=U.S. Pat. No. 3,622,548]; DAS 1,720,450 [=U.S. Pat. No. 3,645,993); and DOS No. 2,427,343 [=old case Huels 348, withdrawn], all of whose disclosures are incorporated by reference herein.

Preferred ethylene-α-olefin (diene) elastomers are those consisting of 45–80% by weight, preferably 50–75% by weight of ethylene and of 55–20% by weight, preferably 50–25% by weight of an α-olefin, preferably propylene and/or butene-1, and containing, optionally, an unconjugated diene in such a quantity that the elastomers have 0.5–30 double bonds/1000 carbon atoms. Especially suitable dienes are cis- and trans-1,4-hexadiene, dicyclopentadiene, 5-methylene-, 5-ethylidene-, and 5-isopropylidene-2-norbornene.

It is important and a critical procedural aspect of the process of this invention that the saturated and unsaturated polyolefin elastomers have a polymer green strength of 5–20 MPa, preferably 8–17 MPa (measured at 25° C. according to DIN [German Industrial Standard] No. 53 504 with a S1 standard rod and 250 mm advancing rate). This criterion is met by the so-called sequence-type polymers. These are understood to mean ethylene-α-olefin copolymers or ethylene-α-olefin-diene terpolymers having chain segments (sequences) of varying lengths built up of ethylene or one of the α-olefins and having portions of the polymer chain in which the monomers are arranged in a statistical distribution (J. C. Randall, Macromolecules 11 (1978) 33).

In addition to the required polymer green strength, it is important that the polymers have a viscosity of 50–150, preferably 70–120, expressed in Mooney units ML(1+4) at 100° C. (measured in accordance with DIN No. 53 523).

Release Agents (a)

Among this group of release agents preferred are the polyethylenes. Crystalline and partially crystalline modifications are suitable, having densities of 0.910–0.975 g/cm$^3$, viscosity numbers (measured according to DIN No. 53 728) of 50–330 cm$^3$/g, and melt indices (measured according to DIN 53 735) of 0.2–50 g/10 min. Polyethylenes within the scope of this invention equivalently include, in addition to homopolymers of ethylene, also copolymers of ethylene and, generally 0,1–15 mole % of other α-olefins of 3–8 carbon atoms, preferably propylene and/or butene-1, within the aforementioned specification limits.

In addition to the listed polyethylene types, suitable such release agents are the polyolefins which are crystalline or partially crystalline homo- and copolymers of propylene with densities of 0.90–0.910 g/cm$^3$, viscosity numbers (measured according to DIN 53 728) of 100–1,000 cm$^3$/g, and melt indices (measured according to DIN 53 735) of 0.1–50 g/10 min, as well as of butene-1 with densities of 0.910–0.975 g/cm$^3$, viscosity numbers (measured according to DIN 53 728) of 100–1000 cm$^3$/g, and melt indices (measured according to DIN No. 53 735) of 0.1–100 g/10 min. The copolymers of propylene and butene-1 are those produced from propylene or butene-1 with, generally 0,1–15 mole % of another α-olefin of up to 8 carbon atoms, preferably of up to 4 carbon atoms. Monomers preferably copolymerized with propylene or butene-1 are, accordingly, ethylene, butene-1 with respect to propylene, and propylene with respect to butene-1. The quantities of these materials in the copolymers, as for all copolymers mentioned herein, are limited by the critical ranges of the mentioned properties (density, viscosity number, melt index).

Finally, it is possible to utilize as release agents in the process of this invention all emulsion and suspension polyvinyl chloride types which have a viscosity number (measured according to DIN No. 53 726) of 50–200, preferably of 70–170 (cm$^3$/g in cyclohexanon).

All these polymeric release agents are prior art products and are produced according to conventional methods [e.g., polyethylene in accordance with German Pat. No. 1,117,875; polypropylene according to German Pat. No. 2,338,478; polybutene-1 according to German Pat. No. 2,318,905; and polyvinyl chloride as in H. Kainer, "Polyvinylchlorid und Vinylchlorid-Mischpolymerisate" [Polyvinyl Chloride and Vinyl Chloride Copolymers], [Springer Publishers, Berlin/Heidelberg/New York (1965)]. All of these disclosures are incorporated by reference herein.

An important factor for the successful utilization of these polymers is that at least 80% by weight of the secondary particles have a diameter of <100 μm, and that the average secondary particle diameter be in the range of 5 to 50 μm, preferably 7 to 36 μm. If the polymers are not obtained or available with an average particle size within these specified limits, they can be produced, for example, by grinding samples having a larger particle size or by freeing samples of proportions having an undesirable secondary particle diameter, for example, by screening.

As is conventional, secondary particles are understood to mean the agglomerates formed by the agglomerating tendency of the finely divided, so-called primary particles. One means of measuring the secondary particle sizes is provided by the so-called "Microtrac" method involving a particle size analyzer manufactured by the firm of Leeds and Northrup, North Wales, Pa., U.S.A., which is based on laser scattering [see Weiss, E. L., and H. N. Frock: Rapid Analysis of Particle Size Distributions by Laser Light-Scattering, Powder Technology 14 (1976), pp. 287–293 which is incorporated by reference herein].

The analyzer is based on the principle of particle-size-dependent light diffraction and measures the particle size distribution over the radial intensity distribution of the diffracted laser beam. The measurements are conducted in an aqueous suspension at measuring times of 50 seconds and a layer thickness of the transilluminated layer of 1.8 mm.

Release Agents (b)

Among this group of release agents preferred are the synthetically produced amorphous silicic acids (SiO$_2$). These are obtained, for example, either by flame hydrolysis of silicon halides (SiO$_2$ content >99.8%) or by precipitation of alkali metal silicates by acids by the wet method. The silicic acids obtained according to the precipitation method can be relatively pure (SiO$_2$ content >99.8%) but can also contain a certain, e.g., 0,05–10 wt. % proportion of calcium silicate (SiO$_2$ content >85%). Furthermore, within the scope of this invention are sodium aluminum silicates. The analysis of a typical such product shows, for example, 75% SiO$_2$, 8% Al$_2$O$_3$, 7% Na$_2$O, 5% annealing loss, and 5% dry loss (weight percent).

Besides these synthetically produced amorphous silicic acids, it is also possible to use naturally occurring silicic acids, as well as silicic-acid-containing minerals. Suitable natural silicic acids include the so-called silicas i.e., processed fractions of chalcedonic silicic acid anhydride (SiO$_2$) and kaolinite [Al$_4$(OH)$_8$Si$_4$O$_{10}$]. The kaolinite proportion is generally 15 to 95% by weight. A typical chemical analysis of such a silica shows the following components: 82% SiO$_2$, 12% Al$_2$O$_3$, 0.6% Fe$_2$O$_3$, 0.2% TiO$_2$, 0.5% CaO/MgO, 0.6% Na$_2$O/K$_2$O, and 4.1% annealing loss. The following are suitable among the silicic-acid-containing minerals: aluminum silicates, e.g., kaolins or kaolin/SiO$_2$ mixtures with a kaolinite proportion of more than 45% or ground slate, as well as magnesium silicates, such as talc [Mg$_3$(Si$_4$O$_{10}$)(OH)$_2$].

All these release agents are products which can either be prepared according to conventional prior-art processes or which occur naturally [for more details, see, for example, "Gmelins Handbuch der anorganischen Chemie" [Gmelin's Handbook of Inorganic Chemistry] 8th edition, "Silicium" [Silicon], Kirk-Othmer, Encyclopedia of Chemical Technology, vol. 18 (1969), and Ullmanns Enzyklopaedia der technischen Chemie [Ullmann's Encyclopedia of Technical Chemistry], vol. 15 (1964)]. They are usually employed as fillers in the rubber industry (such as for example Aerosil ® and Sillitin ®).

The specific average size (mean diameter) of the primary and secondary particles is of importance for the effectiveness of these individual release agents in the process of this invention. Thus, the synthetically prepared amorphous silicic acids have an average primary particle size of 0.01–0.2 μm, preferably up to 0.15 μm, and an average secondary particle size of 5–35 μm, preferably 7–25 μm; at least 65% by weight of the naturally occurring silicic acids have an average primary particle size of <5 μm, preferably 0.7–3.5 μm, and an average secondary particle size of 7–50 μm, preferably 10–40 μm; and the silicic-acid-containing minerals have an average primary particle size of 0.5–2.5 μm, preferably 0.8–2.0 μm, and an average secondary particle size of 10–35 μm, preferably 15–30 μm.

As for group (a), if the release agents cannot be obtained, or are not available with an average particle size within these specified limits, they can be produced, for example, by grinding of samples having a larger particle size, or by freeing samples of proportions having an undesired primary or secondary particle diameter by screening, for example.

The primary particle diameters are determined according to the electron microscope method [see W. A. Ladd, "The Electron Microscope and Its Application to Rubber Testing and Research", Vanderbilt Rubber Handbook, New York (1958), pp. 334 et seq. whose disclosure is incorporated by reference herein].

The discussion under (a) above re the definition and measurement of secondary particle size applies fully to release agents (b).

Release Agents (c)

Carbon blacks which can be used in the process of this invention as release agents include all those customarily employed as fillers in the rubber industry and which have an average primary particle size of <0.3 μm, preferably 0.01–0.25 μm, and especially preferably 0.02–0.2 μm.

Such carbon blacks can be obtained, for example, according to the furnace, electric arc, or channel methods [for more details see, for example, "Ullmanns Enzyklopaedie der technischen Chemie" [Ullmann's Encyclopedia of Technical Chemistry], 3rd ed., vol. 14 (1963), pp. 793 et seq.; S. Bostroem, "Kautschuk-Handbuch" [Rubber Manual], vol. 2 (1960), pp. 259 et seq.; ASTM, Designation: D 1765-68; and "Kautschuk-Lexikon" [Rubber Dictionary] by K. F. Heinisch, A. W. Gentner Publishers, Stuttgart (1977), pp. 434 et seq., all of whose disclosures are incorporated by reference herein].

As above, insofar as the carbon blacks are unobtainable or unavailable with an average particle size within the aforementioned specification limits, they can be produced, for example, by grinding samples having a larger grain size, or by freeing samples of proportions having an undesirable particle diameter by means of screening, for example.

The indicated primary particle diameters are determined by the electron microscope method [see W. A. Ladd, "The Electron Microscope and Its Application to Rubber Testing and Research", Vanderbilt Rubber Handbook, New York (1958), pp. 334 et seq. which is incorporated by reference herein].

The release agents can be added to the ethylene-α-olefin (diene) elastomers before, during or after the grinding process in amounts of 0.5–10, preferably 3–7 parts by weight, based on 100 parts by weight of the ethylene-α-olefin (diene) elastomer. The optimum amount can be readily determined by a few routine orientation experiments. In this connection, it is not to be inferred that the entire amount of release agent added is adsorbed by the elastomer powder. Rather, a portion thereof can certainly be present in a free, i.e., nonadsorbed form. This can optionally be removed by screening, for instance, at a subsequent point in time, for example prior to use of the elastomer powder. Thus, the final elastomer can contain, generally, 0,1–10 wt parts of release agent per 100 wt parts of elastomer.

The general procedure of the method of this invention involves grinding the ethylene-α-olefin (diene) elastomer in the form of crumbs or preliminarily comminuted particles having a mean particle diameter of up to several centimeters, preferably less than 5 cm, in a commercial mill, for example a water-cooled impeller breaker "baffle-plate impact mill] from Pallmann Maschinenfabrik GmbH and Co. KG, 6600 Zweibruecken, to the desired particle size of up to about 1 mm average particle diameter. Before, during or after the grinding process, one or several of the aforementioned release agents are added. The adding of the release agent prior to or during the grinding process is preferred.

During the grinding process proper attention should be given to preventing the temperature of the ground material from being too high so that directly after the grinding step ($\leq 15$ minutes thereafter) it is not higher than 40° C. This can be achieved in a simple way for example by water cooling the mill during the grinding process.

It may be advantageous to allow the pulverulent ethylene-α-olefin (diene) elastomers containing the release agents to cool down, for example, to room temperature (25° C.) before committing them to storage or further processing.

The release-agent-containing, shelf-stable ethylene-α-olefin (diene) elastomer powders produced according to the process of this invention are utilized primarily for the manufacture of shaped articles according to conventional processes of pulverulent elastomer technology. In addition, they are also advantageous for such applications wherein incorporation of ethylene-propylene (diene) elastomer into liquid media, e.g., bitumen, is required. As mentioned above, specific uses may require a prior separation of release agent which has not been adsorbed.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

The pourability and in some cases the agglomerate formation of the products, measured after 24 hours upon application of a load of 1,850 Pa at 45° C., are graded as follows:

| Grade | Description |
|---|---|
| 1 | No agglomerate formation; freely flowing powder |
| 2 | Very loosely coherent agglomerates located in |

| Grade | Description |
|---|---|
| | the pourable powder, disintegrating again to pulverulent condition upon an even very minor, one-time mechanical stress application |
| 3 | Loosely coherent agglomerate body, partially assuming the shape of the storage vessel, disintegrating again into powder and in some cases relatively small agglomerates upon slight torsional or compressive stress, for example when dropping from a minor height |
| 4 | Agglomerate body having the shape of the storage vessel, which can be subdivided into smaller agglomerates and in some cases into powder only by repeated application of torsional or shear stress |
| 5 | Formation of a firmly caked-together agglomerate body in the shape of the storage vessel, which can be divided only with difficulty |

Examples Relating to Release Agents (a)

EXAMPLE 1

An ethylene-propylene elastomer in the form of irregular crumbs (particle diameter≦30 mm) having a propylene content of 28% by weight, a polymer green strength of 13 MPa, and a Mooney viscosity of ML (1+4) 100° C. of 85 is ground in a water-cooled impeller breaker mill from Pallmann Maschinenfabrik GmbH and Co. KG, 6600 Zweibruecken, to an average particle size of 0.5 mm. The temperature of the ground material directly after termination of the grinding step (about 10 minutes) is 38° C.

In a water-cooled trough-type mixer (capacity 10 liters; type of construction: Henschel) 5% by weight of a polyethylene powder having an average secondary particle size of 25 μm, produced according to the low-pressure polymerization method and having a density at room temperature of 0.962 g/cm$^3$ and a melt index according to DIN 53 735 MFI 190/5 of 20 g/10 min, is stirred into 2,000 g of the thus-produced EPM powder at 2,000 rpm over a period of 2 minutes.

Of the EPM powder treated with this release agent, 250 g is introduced, for grading pourability and/or agglomerate formation, into a beaker glass, capacity 800 cc, and stored in a heating cabinet for 24 hours at 45° C., applying during this procedure a load of 1,850 Pa by means of a metal disk. The grade is 2–3. It can be seen therefrom that even after storage at an elevated temperature a pulverulent product is obtained wherein the agglomerate-forming tendency is overcome with low mechanical stresses.

EXAMPLE 2

Elastomer, release agent, and grinding procedure of this example correspond to Example 1, but the polyethylene powder, again present in an amount of 5% by weight, is added to the EPM present in crumb form prior to the grinding step by way of a drum mixer. During the grinding step, release agent collected by screening devices is recycled into the grinding device. After storage at elevated temperature, the pourability and/or agglomerate formation of the product is graded at 2.

EXAMPLE 3

An ethylene-propylene-diene elastomer, present in bale form, containing, besides ethylene, 28% by weight of propylene and 5% by weight of 5-ethylidene-2-norbornene and having a polymer green strength of 13 MPa and a Mooney viscosity of ML (1+4) 100° C. of 85, is first preliminarily comminuted into chips having an average diameter of about 1 cm. Then 5% by weight of the polyethylene also used in Examples 1 and 2 is added to the chips via a drum mixer prior to the grinding process, which latter is thereafter executed as described in Example 1. The temperature of the ground material about 8 minutes after termination of the grinding step is 37° C. After storage at elevated temperature, the pourability and/or agglomerate formation of the product having an average particle size of 0.5 mm is graded at 2–3.

EXAMPLE 4 (in analogy to example 1)

An EPM powder containing release agent is prepared with the EPM elastomer and the mode of operation according to Example 1, using for this purpose 5% by weight of a polypropylene powder manufactured by the low-pressure polymerization process with an average secondary particle diameter of 30 μm. The polypropylene has, at room temperature, a density of 0.907 g/cm$^3$ and a melt index according to DIN 53 735 MFI 190/5 of 20 g/10 min.

The temperature of the ground material about 10 minutes after ending the grinding step is 38.5° C. The pourability and/or agglomerate formation of the product is graded at 3.

EXAMPLE 5 (in analogy to example 1)

An EPM powder containing release agent is prepared with the EPM elastomer and the mode of operation described in Example 1, using for this purpose 5% by weight of a polyvinyl chloride powder having an average secondary particle size of 9 μm and produced according to an emulsion method.

The temperature of the ground material about 12 minutes after termination of the grinding step is 37° C. The pourability and/or agglomerate formation of the product is graded at 2.

EXAMPLE 6 (in analogy to example 2)

Example 5 is repeated, with the difference that the mode of operation of Example 2 is employed.

The pourability and/or agglomerate formation of the product is graded at 1–2.

Release Agents (b)

EXAMPLE 7 (in analogy to example 1)

An ethylene-propylene elastomer in the form of irregular crumbs (particle diameter≦30 mm) having a propylene content of 28% by weight, a polymer green strength of 13 MPa, and a Mooney viscosity of ML (1+4) 100° C. of 85 is ground in a water-cooled impeller breaker mill from Pallmann Maschinenfabrik GmbH and Co. KG, 6600 Zweibruecken, to an average particle size of 0.5 mm. The temperature of the ground material directly after termination of the grinding step (about 10 minutes) is 38° C.

In a water-cooled trough-type mixer (capacity 10 liters, type of construction: Henschel), 5% by weight of an amorphous silicic acid, pyrogenically produced and having an average primary particle diameter of 0.012 μm and an average secondary particle diameter of 10 μm is stirred into 2,000 g of the thus-produced EPM powder at 2,000 rpm over a period of 2 minutes.

Of the EPM powder treated with this release agent, 250 g is introduced, for grading pourability and/or agglomerate formation, into a beaker glass, capacity 800 cc, and stored in a heating cabinet for 24 hours at 45° C., applying during this procedure a load of 1,850 Pa by means of a metal disk. The grade is 1. It can be seen therefrom that even after storage at an elevated temperature a pulverulent product remains which is devoid of agglomerate formation and is in a free-flowing, pourable condition.

EXAMPLE 8 (in analogy to example 2)

Elastomer, release agent, and grinding procedure of this example correspond to Example 7, but the silicic acid, again present in an amount of 5% by weight, is added to the EPM present in crumb form prior to the grinding step by way of a drum mixer. During the grinding step, release agent collected by screening devices is recycled into the grinding device. After storage at elevated temperature, the pourability of the product is graded at 1.

EXAMPLE 9 (in analogy to example 3)

An ethylene-propylene-diene elastomer, present in bale form, containing, besides ethylene, 28% by weight of propylene and 5% by weight of 5-ethylidene-2-norbornene and having a polymer green strength of 13 MPa and a Mooney viscosity of ML (1+4) 100° C. of 85 is first preliminarily comminuted into chips having an average diameter of about 1 cm. Then 5% by weight of the release agent also used in Examples 7 and 8 is added to the chips via a drum mixer prior to the grinding process, which latter is thereafter executed as described in Example 1. The temperature of the ground material about 8 minutes after termination of the grinding step is 37° C. After storage at elevated temperature, the pourability and/or agglomerate formation of the product having an average particle size of 0.5 mm is graded at 2.

EXAMPLE 10 (in analogy to example 1)

An EPM powder containing release agent is prepared with the EPM elastomer and the mode of operation according to Example 1, using for this purpose 5% by weight of a wet-precipitated, amorphous silicic acid with an average primary particle diameter of 0.085 μm and an average secondary particle diameter of 11 μm.

The temperature of the ground material about 10 minutes after ending the grinding step is 38.5° C. The pourability and/or agglomerate formation of the product is graded at 2–3.

EXAMPLE 11 (in analogy to example 2)

Example 10 is repeated, with the difference that the mode of operation of Example 2 is employed.

The pourability and/or agglomerate formation of the product is graded at 1–2.

EXAMPLE 12 (in analogy to example 1)

Using the EPM elastomer and the mode of the operation according to Example 1, an EPM powder is produced which contains release agent, which for purposes of the end use is made of 5% by weight of a naturally occurring mixture, processed by screening, of 40% by weight of chalcedony-containing silicic acid anhydride and 60% by weight of kaolinite having an average primary particle size of 0.8 μm and an average secondary particle size of <20 μm.

The temperature of the ground material about 12 minutes after termination of the grinding step is 37° C. The pourability and/or agglomerate formation of the product is graded at 2.

EXAMPLE 13 (in analogy to example 1)

Using the EPM elastomer and the mode of operation described in Example 1, a release-agent-containing EPM powder is produced, using for this purpose 5% by weight of ground slate (primary component kaolinite) stemming from natural deposits and processed by sifting, with an average primary particle size of 1.8 μm and an average secondary particle size of 28 μm.

The temperature of the ground material about 10 minutes after ending the grinding step is 38.5° C. The pourability and/or agglomerate formation of the product is graded at 3.

Release Agents (c)

EXAMPLE 14 (in analogy to example 1)

An ethylene-propylene elastomer in the form of irregular crumbs (particle diameter ≦ 30 mm) having a propylene content of 28% by weight, a polymer green strength of 13 MPa, and a Mooney viscosity of ML (1+4) 100° C. of 85 is ground in a water-cooled impeller breaker mill from Pallmann Maschinenfabrik GmbH and Co. KG, 6600 Zweibruecken, to an average particle size of 0.5 mm. The temperature of the ground material directly (about 10 minutes) after termination of the grinding step is 38° C.

In a water-cooled trough-type mixer, (capacity 10 liters, type of construction: Henschel), 5% by weight of a carbon black manufactured according to the electric arc method and having an average primary particle size of 0.02 μm is stirred into 2,000 g of the thus-produced EPM powder at 2,000 rpm over a period of 2 minutes.

Of the EPM powder treated with this release agent, 250 g is introduced, for grading pourability and/or agglomerate formation, into a beaker glass, capacity 800 cc, and stored in a heating cabinet for 24 hours at 45° C., applying during this procedure a load of 1,850 Pa by means of a metal disk. The grade is 2. It can be seen therefrom that even after storage at an elevated temperature a pulverulent product is obtained wherein the agglomerate-forming tendency is overcome with low mechanical stresses.

EXAMPLE 15 (in analogy to example 2)

Elastomer, release agent, and grinding procedure of this example correspond to Example 14, but the electric-arc carbon black again present in an amount of 5% by weight, is added to the EPM present in crumb form prior to the grinding step by way of a drum mixer. During the grinding step, release agent collected by screening devices is recycled into the grinding device. After storage at elevated temperature, the pourability of the product is graded at 1.

EXAMPLE 16 (in analogy to example 3)

An ethylene-propylene-diene elastomer, present in bale form, containing, besides ethylene, 28% by weight of propylene and 5% by weight of 5-ethylidene-2-norbornene and exhibiting a polymer green strength of 13 MPa and a Mooney viscosity of ML (1+4) 100° C. of 85, is first preliminarily comminuted into chips having an average diameter of about 1 cm. Then, 5% by weight of the electric-arc carbon black also used in Examples 14 and 15 is added to the chips via a drum mixer prior to the grinding process, which latter is thereafter executed as described in Example 1. The temperature of the ground material about 8 minutes after termination of the grinding step is 37° C. After storage at elevated temperature, the pourability and/or agglomerate formation of the product having an average particle size of 0.5 mm is graded at 2-3.

EXAMPLE 17 (in analogy to example 1)

An EPM powder containing release agent is prepared with the EPM elastomer and the mode of operation according to Example 1, using for this purpose 5% by weight of a carbon black produced according to the furnace method with an average primary particle size of 0.025 μm.

The temperature of the ground material about 12 minutes after ending the grinding step is 37° C. The pourability and/or agglomerate formation of the product is graded 1-2.

EXAMPLE 18 (in analogy to example 1)

Example 17 is repeated with a carbon black produced according to the furnace method with an average primary particle size of 0.2 μm.

The pourability and/or agglomerate formation of the product is graded at 3.

COMPARATIVE EXAMPLES A and B

The procedures described in Examples 1 and 3 are repeated without the addition of a release agent, resulting in products with grades in pourability and/or agglomerate formation of 4-5 and 5, respectively, i.e., the products cluster together after storage at elevated temperature into agglomerate bodies having the shape of the storage vessel, which bodies can practically no longer be divided.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a shelf-stable ethylene-α-olefin (diene) elastomer powder which comprises a release agent, comprising grinding crumbs or preliminarily comminuted particles of an ethylene-α-olefin (diene) elastomer having a green strength of 5-20 MPa and a Mooney viscosity ML (1+4) 100° C. of 50-150, and, prior to, during or after the grinding step, adding 0.5-10 parts by weight, per 100 parts by weight of the ethylene-α-olefin (diene) elastomer, of a release agent which is (a) polyethylene of a density of 0.910-0.975 g/cm$^3$, a viscosity number of 50-330 cm$^3$/g and a melt index of 0.2-50 g/10 min, polypropylene of a density of 0.90-0.910 g/cm$^3$, a viscosity number of 100-1000 cm$^3$/g and a melt index of 0.1-50 g/10 min, polybutene-1 of a density of 0.910-0.975 g/cm$^3$, a viscosity number of 100-1000 cm$^3$/g and a melt index of 0.1-100 g/10 min, or polyvinyl chloride of a viscosity number of 50-200, all having an average secondary particle size of 5-50 μm;

(b) a synthetic amorphous silicic acid (SiO$_2$) having an average primary particle size of 0.01-0.2 μm and an average secondary particle size of 5-35 μm; a naturally occurring silicic acid, at least 65% by weight of which has an average primary particle diameter of <5 μm and an average secondary particle size of 7-50 μm; or a silicic-acid-containing mineral having an average primary particle size of 0.5-2.5 μm and an average secondary particle size of 10-35 μm; or (c) a carbon black with an average primary particle size of <0.3 μm.

2. A process of claim 1, wherein the release agent (a) is added to the elastomer.

3. A process of claim 1, wherein the release agent (b) is added to the elastomer.

4. A process of claim 1, wherein the release agent (c) is added to the elastomer.

5. A process of claims 2, 3 or 4, wherein the amount of release agent added is 3-7 parts by weight, based on 100 parts by weight of ethylene-α-olefin (diene) elastomer.

6. A process of claim 2, 3 or 4 wherein the temperature of the ground material directly after the grinding step is no higher than 40° C.

7. A process of claim 5, wherein the elastomer consists essentially of 45-80% by weight of ethylene and 55-20% by weight of propylene or butene-1 and, optionally, an unconjugated diene in an amount that the elastomer has 0.5-30 double bonds/1000 C-atoms, and wherein the elastomer has a polymer green strength of 8-17 MPa and and a Mooney viscosity of 70-120.

8. A process of claim 2, wherein the polymer admixed as the release agent has an average secondary particle size of 7-36 μm.

9. A process of claim 2, wherein the release agent is homopolyethylene.

10. A process of claim 3, wherein the release agent is a synthetic amorphous silicic acid (SiO$_2$) produced by flame hydrolysis of a silicon halide or by precipitation of an alkali metal silicate by an acid, and has an average primary particle size of 0.01-0.15 μm and an average secondary particle size of 7-25 μm.

11. A process of claim 3, wherein the release agent is a natural silica of which at least 65% by weight has an average primary particle size of 0.7-3.5 μm and an average secondary particle size of 10-40 μm; or is an aluminum or magnesium silicate of an average primary particle size of 0.8-2.0 μm, and an average secondary particle size of 15-30 μm.

12. A process of claim 4, wherein the carbon black is one prepared by the furnace, electric arc or channel method and has an average primary particle size of 0.01-0.25 μm.

13. A shelf-stable ethylene-α-olefin (diene) elastomer powder containing a release agent and prepared by a process of claims 2, 3 or 4.

* * * * *